United States Patent [19]

Karabinis et al.

[11] 4,373,210
[45] Feb. 8, 1983

[54] SPACE DIVERSITY COMBINER

[75] Inventors: Peter D. Karabinis, Atkinson, N.H.; Hotze Miedema, Boxford, Mass.

[73] Assignee: Bell Telephone Laboratories, Incorporated, Murray Hill, N.J.

[21] Appl. No.: 248,356

[22] Filed: Mar. 27, 1981

[51] Int. Cl.³ .............................................. H04B 1/06
[52] U.S. Cl. .................................. 455/273; 455/139; 455/276; 455/278
[58] Field of Search ............................... 455/137–139, 455/272, 273, 276, 278, 52, 65; 375/100

[56] References Cited

U.S. PATENT DOCUMENTS

| | | | |
|---|---|---|---|
| 3,036,276 | 5/1962 | Brown | 455/138 |
| 3,167,761 | 1/1965 | Parquier | 455/278 |
| 3,633,107 | 1/1972 | Brady | 455/52 |
| 4,075,566 | 2/1978 | D'Arcangelis | 455/276 |
| 4,100,496 | 7/1978 | Akiyoshi et al. | 455/276 |
| 4,160,952 | 7/1979 | Seastrand, Jr. | 455/278 |

*Primary Examiner*—Jin F. Ng
*Attorney, Agent, or Firm*—S. Sherman

[57] ABSTRACT

The benefits of space diversity combining in the presence of interference has been found to depend upon the signal-to-interference ratios at the two antennas. For optimum results, the signal-to-interference ratios should not differ by more than ±3 dB. If they do, an attenuator (12) is included in the antenna circuit (10) having the poorer signal-to-interference ratio so as to reduce the signal contribution from that antenna. Optimum signal conditions are disclosed.

2 Claims, 1 Drawing Figure

SPACE DIVERSITY COMBINER

TECHNICAL FIELD

This invention relates to space diversity signal combining networks and, in particular, to such networks for use in an interference controlled environment.

BACKGROUND OF THE INVENTION

In space diversity radio systems, two spaced antennas are used to feed a common receiver as a means of reducing outages due to multipath fading. For narrow band systems, dispersion effects can be neglected, and the signal combiner designed to maximize the combined output signal. Since signal diversity combining reduces the fade probability, it was expected that this technique would also reduce overall system outage time. However, it was found during a test period of over five months that at one location the combined signal actually produced more errored seconds than an unprotected channel.

SUMMARY OF THE INVENTION

The present invention is based upon the discovery that in an interference controlled environment, the contributions of both antennas may have to be unequal to obtain maximum benefit from combining space diversity signals. In particular, it was found that the benefits of space diversity depend very much upon the relative signal-to-interference ratios (S/I) at the two antennas. Maximum benefits are realized when the two antennas have approximately equal signal-to-interference ratios. (In practice, a difference of up to 3 dB can be tolerated.) For larger differences, the signal contributed by the antenna with the poorer S/I ratio should be reduced to optimize the space diversity improvement. Accordingly, in a space diversity combiner in accordance with the present invention, attenuating means are included in the antenna circuit with the poorer S/I ratio. In a preferred embodiment, the unfaded power ratio $S_1'/S_2$ of the two signals, after attenuation of the signal $S_1$ with the poorer signal-to-interference ratio, is equal to the unfaded ratio of the signal-to-interference ratios $(S_1/I_1)/(S_2/I_2)$ at the two antennas.

DETAILED DESCRIPTION

Figure 1:
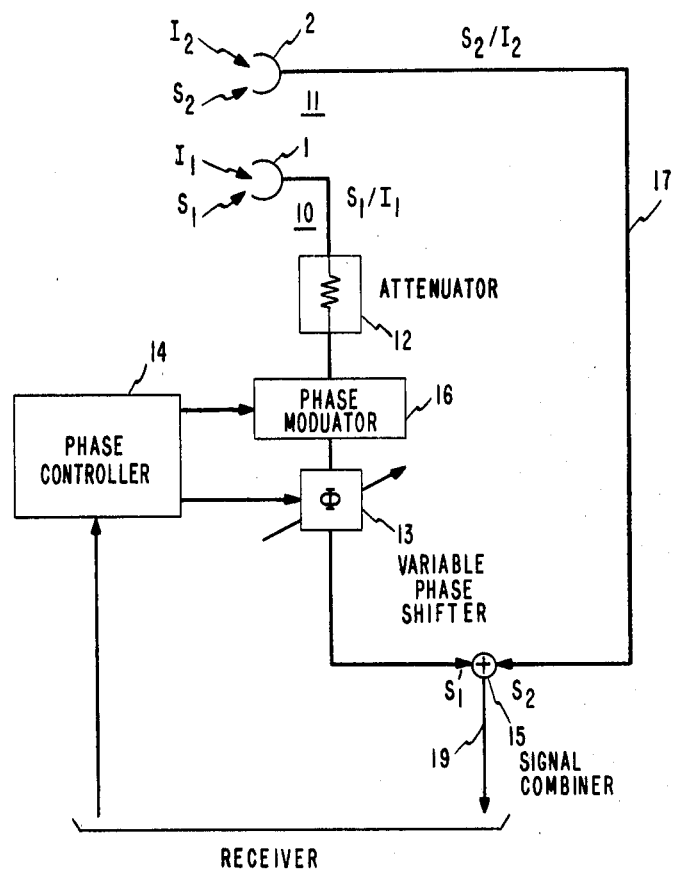

Referring to the drawing, the FIGURE shows in block diagram a diversity signal combining network in accordance with the present invention.

The network comprises a pair of antenna circuits 10 and 11, a phase controller 14, and a signal combiner 15. In the illustrative embodiment, antenna circuit 10 comprises an antenna 1, an attenuator 12, a phase modulator 16, and a variable phase shifter 13. The second antenna circuit 11 comprises an antenna 2, and a length of transmission path 17.

The signals in the two antenna circuits are combined by means of signal combiner 15 whose common output circuit 19 is coupled to a receiver (not shown).

The phase shifter 13 is controlled by phase controller 14 in response to a control signal generated in the receiver. The phase controller supplies an amplitude-constant frequency sinusoid to the phase modulator 16.

In operation, the received signals $S_1$ and $S_2$ arrive at some arbitrary phase relative to each other. If the two signals are to be combined for maximum power at the receiver, a compensating phase shift must be introduced by phase shifter 13. The amount of phase shift is determined by phase modulating signal $S_1$ by means of a relatively low frequency sinusoid and sensing the resulting amplitude modulation on the combined signal. The phase controller adjusts the phase shifter so as to minimize the amplitude modulation. (See, for example, U.S. Pat. No. 4,160,952 for a more detailed discussion of phase control in diversity combiners.)

As indicated hereinabove, it was anticipated that the use of such a system would reduce the fading probability which, in turn, would reduce the outage time in digital transmission systems. This, however, did not prove to be the case in one particular situation. It was recognized that the signals from both antennas were subject to interference and that the interference level exceeded the thermal noise of the receiver. Outage conditions were, therefore, caused by the interference rather than the thermal noise.

If both antennas have identical fading statistics and the same S/I ratio in the absence of fading, the use of space diversity combining improves the S/I distribution of the combined signal by reducing the signal fading probability. In this case, an outage occurs only when the signals at both antennas fade simultaneously to below some threshold level.

However, if the maximum S/I ratio at one antenna is lower than that of the other, a correspondingly shallower fade of the former during a simultaneous fade will initiate outage conditions. In general, the outage probability will increase as the S/I difference between the two antennas increases and, at some point, the effect of the interference, contributed by the poorer antenna, will negate the benefits of space diversity combining. This tendency can be countered by reducing the contribution of the poorer antenna. However, if the contribution is reduced too much, the combined signal approaches that of the better antenna used alone and so does the outage time. Thus, in accordance with the present invention, attenuator means 12 are included in the antenna circuit of the antenna having the poorer S/I ratio. For purposes of illustration, it is assumed that the signal-to-interference ratio $S_1/I_1$ of antenna 1 is less than the ratio $S_2/I_2$ of antenna 2. In particular, it was found that there is an optimum signal contribution of the poorer antenna which will minimize the outage of the combined signal. This relation, given by $$S_1'/S_2 = (S_1/I_1)/(S_2/I_2) \qquad (1)$$

states that for optimum diversity operation (minimum outage), the ratio of the signal power contributions $S_1'$ and $S_2$ shoud equal the ratio of signal-to-interference ratios, where $S_1'$ is the signal power contribution from antenna 1 after attenuation. Thus, for optimum performance, the S/I ratios of the two antennas are measured during non-fade periods, and the attenuator adjusted for the preferred signal condition in the poorer antenna circuit. As a practical matter, it was found that an adjustment error of ±3 dB has only a minor effect upon the outage time.

It will be recognized that the particular circuit configuration shown is illustrative of only one of many alternative space diversity combiner configurations that can be devised. For example, while the attenuator is always placed in the antenna circuit with the poorer S/I ratio, the phase modulator and phase shifter can be located in either antenna circuit. In addition, the particular method of phase adjustment is only illustrative of one of many known techniques.

What is claimed is:

1. A space diversity combiner comprising:
   first and second antenna circuits (10, 11);
   means (15) for combining the signals ($S_1$ and $S_2$) in said circuits in a common output circuit (19);
   and attenuating means (12) disposed in the antenna circuit (10) having the smaller signal-to-interference ratio ($S_1/I_1$);
   said attenuator being adjusted to reduce the contribution of the signal ($S_1$) in the antenna circuit (10) having the smaller signal-to-interference ratio such that the attenuated signal power $S_1'$ at the input of said combining means (15) is given by $$S_1'/S_2 = (S_1/I_1)/S_2/I_2$$

where
$S_1/I_1$ and $S_2/I_2$ are the signal-to-interference power ratios for the two antennas; and $$S_1/I_1 < S_2/I_2.$$

2. The combiner according to claim 1 including phase control means (13, 14, 16) for varying the relative phase of the two signals ($S_1$, $S_2$) so that they combine in phase in the signal combiner (15).

* * * * *